US006155586A

United States Patent [19]

Melgarejo et al.

[11] Patent Number: 6,155,586

[45] Date of Patent: Dec. 5, 2000

[54] LOCKING SYSTEM FOR A FOOTREST HANGER

[75] Inventors: Mauricio Melgarejo; Alejandro Melgarejo, both of Simi Valley, Calif.

[73] Assignee: Freedom Designs Incorporated, Simi Valley, Calif.

[21] Appl. No.: 09/191,480

[22] Filed: Nov. 13, 1998

[51] Int. Cl.[7] .................... B62M 1/14

[52] U.S. Cl. .................... 280/304.1; 280/291; 297/423.25; 297/423.37

[58] Field of Search .................... 280/304.1, 291, 280/250.1, 288.4, 647; 297/DIG. 4, 423.19, 423.25, 423.37, 423.4, 423.1

[56] References Cited

U.S. PATENT DOCUMENTS

| | | | |
|---|---|---|---|
| 2,868,275 | 1/1959 | Mize | 155/165 |
| 3,230,010 | 1/1966 | Mommsen | 297/429 |
| 3,453,027 | 7/1969 | Pivacek | 297/429 |
| 3,482,873 | 12/1969 | Pivacek | 297/429 |
| 4,176,879 | 12/1979 | Rodaway | 297/429 |
| 4,722,572 | 2/1988 | Sata | 280/242 |
| 4,729,573 | 3/1988 | Davis | 280/304.1 |
| 5,076,602 | 12/1991 | Robertson et al. | 280/304.1 |
| 5,186,480 | 2/1993 | Morgan et al. | 280/304.1 |
| 5,364,165 | 11/1994 | Okamoto | 280/304.1 |
| 5,522,644 | 6/1996 | Peek | 297/423.26 |

*Primary Examiner*—Daniel G. DePumpo
*Attorney, Agent, or Firm*—Oppenheimer Wolff & Donnelly LLP

[57] ABSTRACT

A locking system has a side frame having an open end and a spring-loaded hanger release insert extending therefrom. The system also has a hanger body having an upper portion with a terminal end. A hanger pivot fitting extends generally downwardly from the upper portion of the terminal end. A hanger locking surface extends outwardly from the terminal end. The spring-loaded hanger release insert has an upturned mating surface and the hanger locking surface has a downturned mating surface compatible with the upturned mating surface. A hanger release arm is interconnected with the spring-loaded hanger release insert. The system may further include a hanger brace extending from the hanger body, having an alignment guide at an end of the hanger brace. The hanger locking surface may have an angled, generally outwardly-extending face with a step, and the hanger release insert may have an angled, generally outwardly-extending face with a step, each of the steps defining a mutually-compatible mating surface. The side frame may further include a hanger support block extending from the side frame and adapted to support the hanger brace when the hanger brace is locked onto the side frame. The side frame may comprise a top, a bottom, a first side and a second side. The side frame may further comprise a hanger plate extending between the top and the first side. The hanger release arm is then connected to the hanger plate. The side frame comprises a tube, and a portion of the hanger release insert is secured within the tube. A compression spring or other biasing mechanism is secured within the tube to provide compression force against the hanger release insert. The locking surface may be a portion of a side frame locking piece, the hanger comprising a tube. A portion of the locking piece may be secured within the tube, the locking surface extending out of the tube.

13 Claims, 6 Drawing Sheets

LOCKING SYSTEM FOR A FOOTREST HANGER

I. BACKGROUND OF THE INVENTION a. Field of the Invention

The present invention relates to wheelchairs and, in particular, to a locking mechanism to lock a footrest hanger onto a wheelchair side frame.

b. Prior Art

The typical wheelchair is provided with footrest hangers that extend downwardly in front of the wheelchair from respective wheelchair side frames for the purpose of supporting the footrests. When the user sits in the wheelchair, a footrest provides support for the user's feet. The typical footrest hanger has an upper portion that extends out of the wheelchair side frame and which then curves into a substantially straight downwardly-extending portion that leads to the footrest. The hanger is typically removably locked onto the side frame, but the lock is releasable so that the hanger can be taken off.

Prior art approaches to locking the hanger into position on the wheelchair have drawbacks. One approach is to mount a spring loaded pin in the interior of a portion of the side frame. The side frame is typically tubular with a hollow area inside. The hanger is provided with a downwardly extending portion having an indentation that is compatible with the spring-loaded pin in the side frame tube. As the downwardly extending portion of the hanger is inserted into the tube, the pin engages with the indentation, thereby locking the hanger into place on the frame. A recurring problem with this arrangement is that when the user puts his or her foot down onto the footrest, the user's foot pushes the hanger downwardly, thereby disengaging the hanger from the engagement with the engagement pin. The hanger is then free to rotate from side to side and can easily become disengaged from the side frame.

Another approach is to provide the side frame with an upwardly-extending pin having a wide head. The hanger is then provided with a bracket having an opening to receive the wide head, and a relatively narrower slot adjacent thereto for engaging the wide head. The user typically rotates the hanger after the head has been inserted into the head-receiving opening in order to lock the hanger into place. A problem with this approach is that it is cumbersome for the user and is hard to use.

What is needed, then, is an improved locking mechanism for a wheelchair footrest hanger that will securely hold the hanger in place on the side frame and that is convenient to use.

II. SUMMARY OF THE INVENTION

In light of the various problems with the prior art, the present invention seeks to provide an improved locking mechanism for a wheelchair footrest. The present invention provides a locking system that is secure and convenient to use. In general, this is accomplished with a biased system of mating surfaces on the side frame and the footrest hanger.

While the present invention is not limited to any one particular embodiment of the present invention, in accordance with one embodiment a locking system for a wheelchair side frame and a corresponding hanger has a side frame, a footrest hanger, and means for locking the footrest hanger onto the side frame. The system may also include means for releasing the means for locking the footrest hanger when the footrest hanger is locked onto the side frame. The system may further include means for bracing the hanger against the side frame, and/or means for connecting the hanger brace to the side frame.

In accordance with another embodiment, a locking system has a side frame having an open end and a spring-loaded hanger release insert extending therefrom. The system also has a hanger body having an upper portion with a terminal end. A hanger pivot fitting extends generally downwardly from the upper portion of the terminal end. A hanger locking surface extends outwardly from the terminal end. The spring-loaded hanger release insert has an upturned mating surface and the hanger locking surface has a downturned mating surface compatible with the upturned mating surface. A hanger release arm is interconnected with the spring-loaded hanger release insert.

The system may further include a hanger brace extending from the hanger body, having an alignment guide at an end of the hanger brace. Other possible features include the hanger locking surface having an angled, generally outwardly-extending face with a step, and the hanger release insert having an angled, generally outwardly-extending face with a step, each of the steps defining a mutually-compatible mating surface. The side frame may further include a hanger support block extending from the side frame and adapted to support the hanger brace when the hanger brace is locked onto the side frame. The side frame may comprise a top, a bottom, a first side and a second side. The side frame may further comprise a hanger plate extending between the top and the first side. The hanger release arm is then connected to the hanger plate. The side frame comprises a tube, and a portion of the hanger release insert is secured within the tube. A compression spring or other biasing mechanism is secured within the tube to provide compression force against the hanger release insert. The locking surface may be a portion of a side frame locking piece, the hanger comprising a tube. A portion of the locking piece may be secured within the tube, with the locking surface extending out of the tube.

In accordance with another embodiment of the present invention, a footrest hanger for a wheelchair has a hanger body with an upper portion and a terminal end on the upper portion. A hanger pivot fitting extends generally downwardly from the upper portion. A hanger locking surface extends from the terminal end. The footrest hanger may have a brace extending from the hanger body, with an alignment guide at an end of the hanger brace. The hanger brace may have any of a variety of different cross-sections, and is generally tubular. The alignment guide may comprise a concave face adapted to be engaged with a tubular surface. The hanger locking surface may comprise an angled face with a step. The locking surface may be a portion of a side frame locking piece, the footrest comprising a tubular portion, a portion of the locking piece being secured within the tube, and the locking surface extending out of the tube.

Other objects, features, and advantages of the present invention will become apparent through reference to the drawings, the Detailed Description, and the claims.

III. BRIEF DESCRIPTION OF THE DRAWINGS

FIG. 1 is a perspective view of a wheelchair having a footrest hanger;

FIG. 2 a side view of a footrest hanger and sideframe assembly;

IV. DETAILED DESCRIPTION OF THE PREFERRED EMBODIMENT

Figure 1:
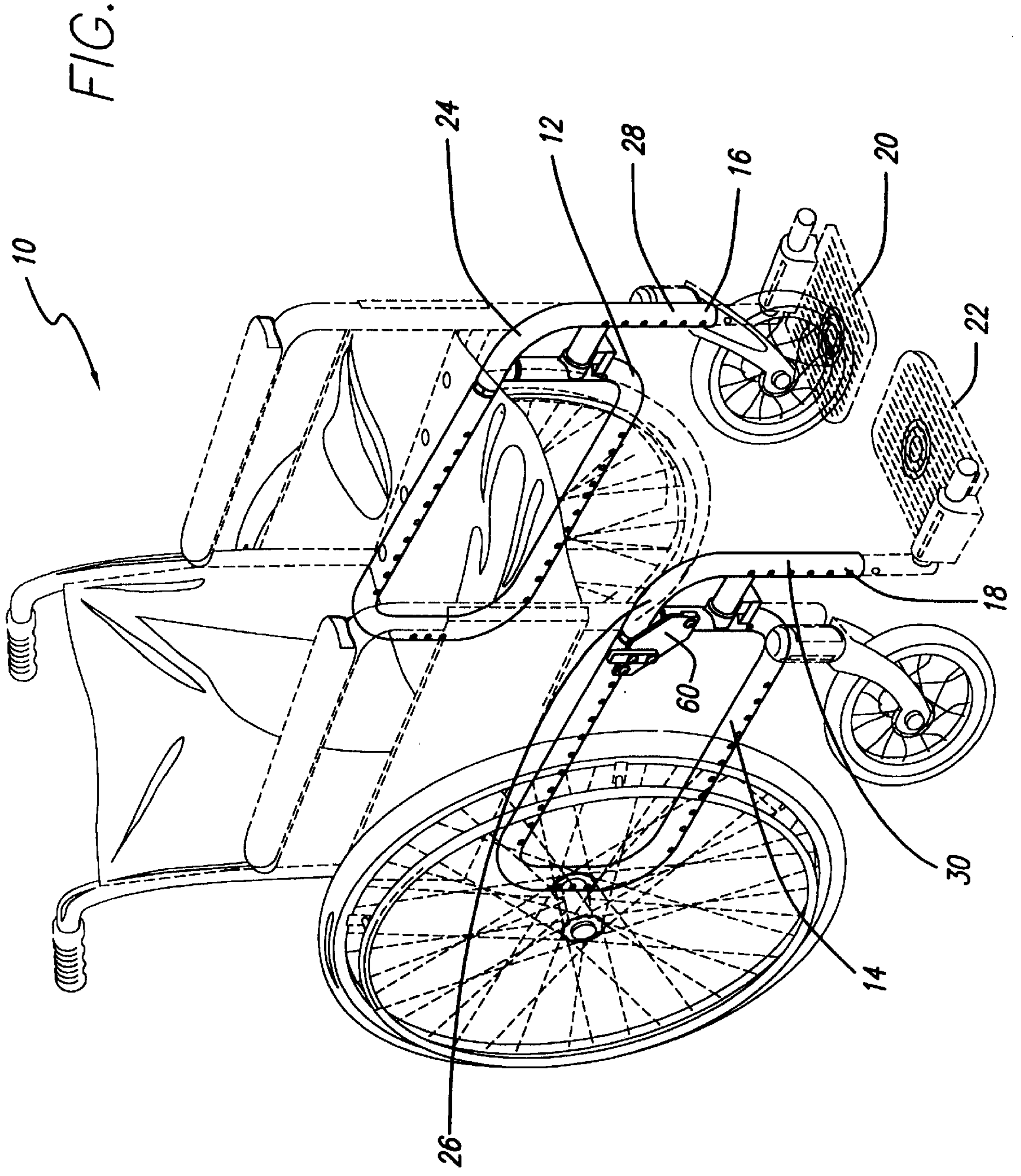

FIG. 1 illustrates a wheelchair 10 having right and left side frames 12 and 14. Right and left swing away footrest hangers 16 and 18 are locked on the right and left side frames 12 and 14, respectively. Right and left foot plates 20 and 22 are connected to the respective right and left footrest hangers 16 and 18, respectively. In this particular embodiment, the swing away footrest hangers 16 and 18 have respective upper portions 24 and 26 and respective lower portions 28 and 30. In this particular embodiment, the angle between the upper and lower portions of each swing away footrest is approximately 90 degrees. In other embodiments, the angle between the upper and lower portions of the footrest may be greater, for instance, in order to slightly extend the leg when resting on a respective foot plate.

Figure 2:
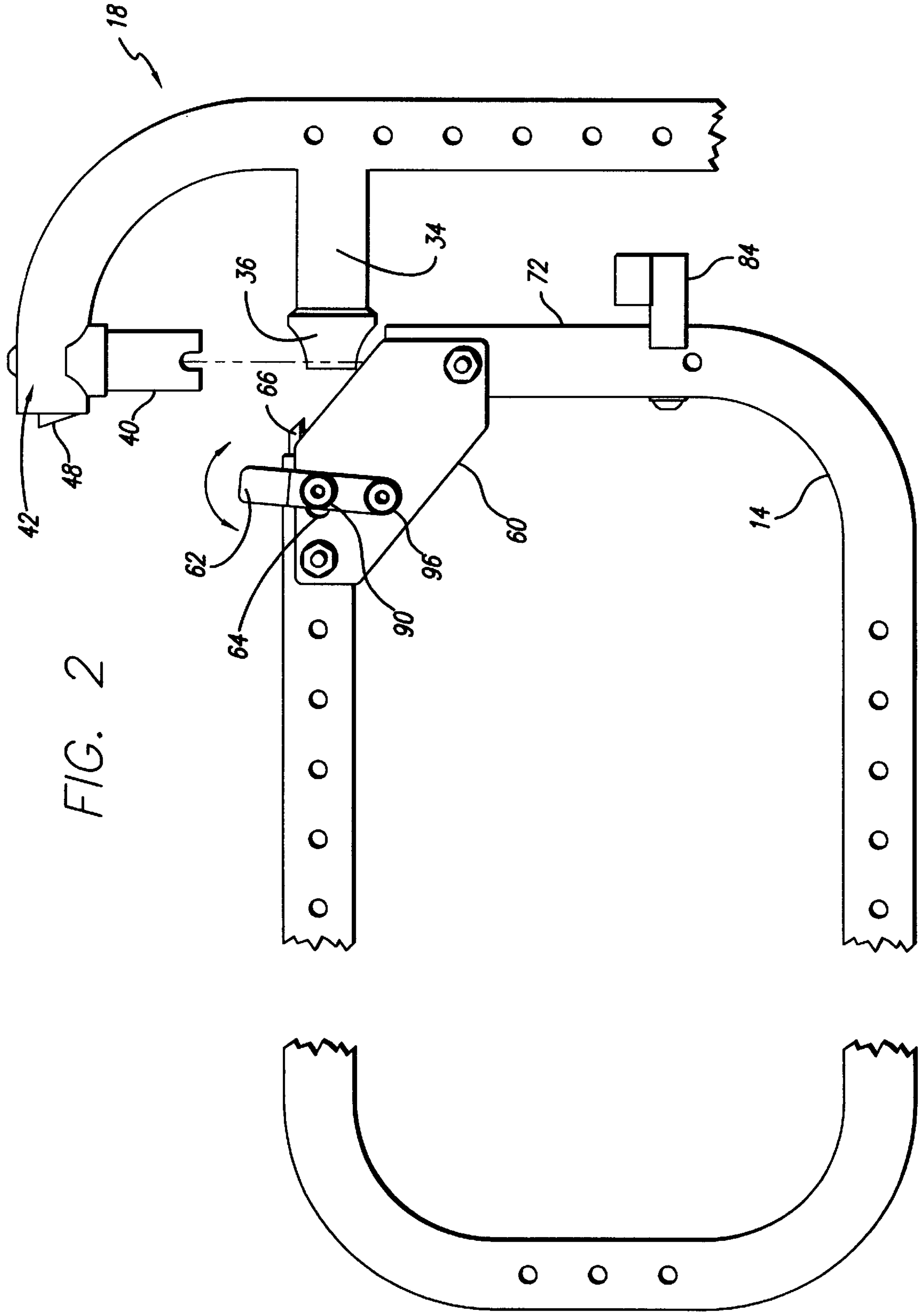
Figure 3:
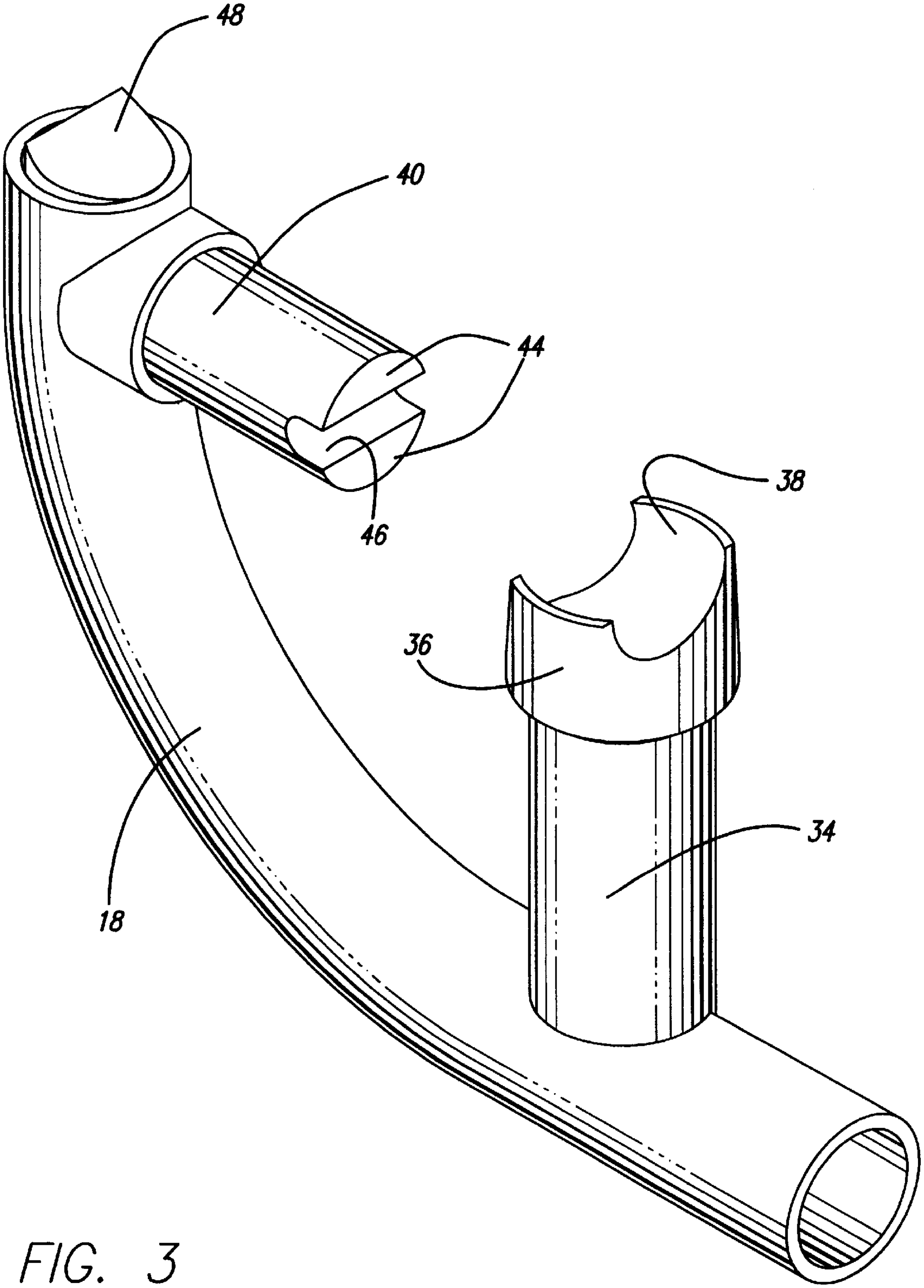
FIG. 3 is a perspective view of a portion of a footrest hanger.

Considering the side frames and footrest hangers in more detail, FIG. 2 illustrates a side view of the left side frame 14 and the left swing away footrest hanger 18. In this particular drawing, the swing away footrest hanger 18 is shown disengaged from the side frame 14. The swing away footrest hanger 18 includes a hanger brace 34 and a hanger alignment guide 36. Referring to FIG. 3, the hanger alignment guide 36 has a concave engagement surface 38 which is adopted to rest against a substantially cylindrical surface such as the side of a tube. Referring again to FIG. 2, the footrest hanger 18 also includes a hanger pivot fitting 40 extending from the upper terminal end portion 42 of the footrest hanger 18.

Figure 4:
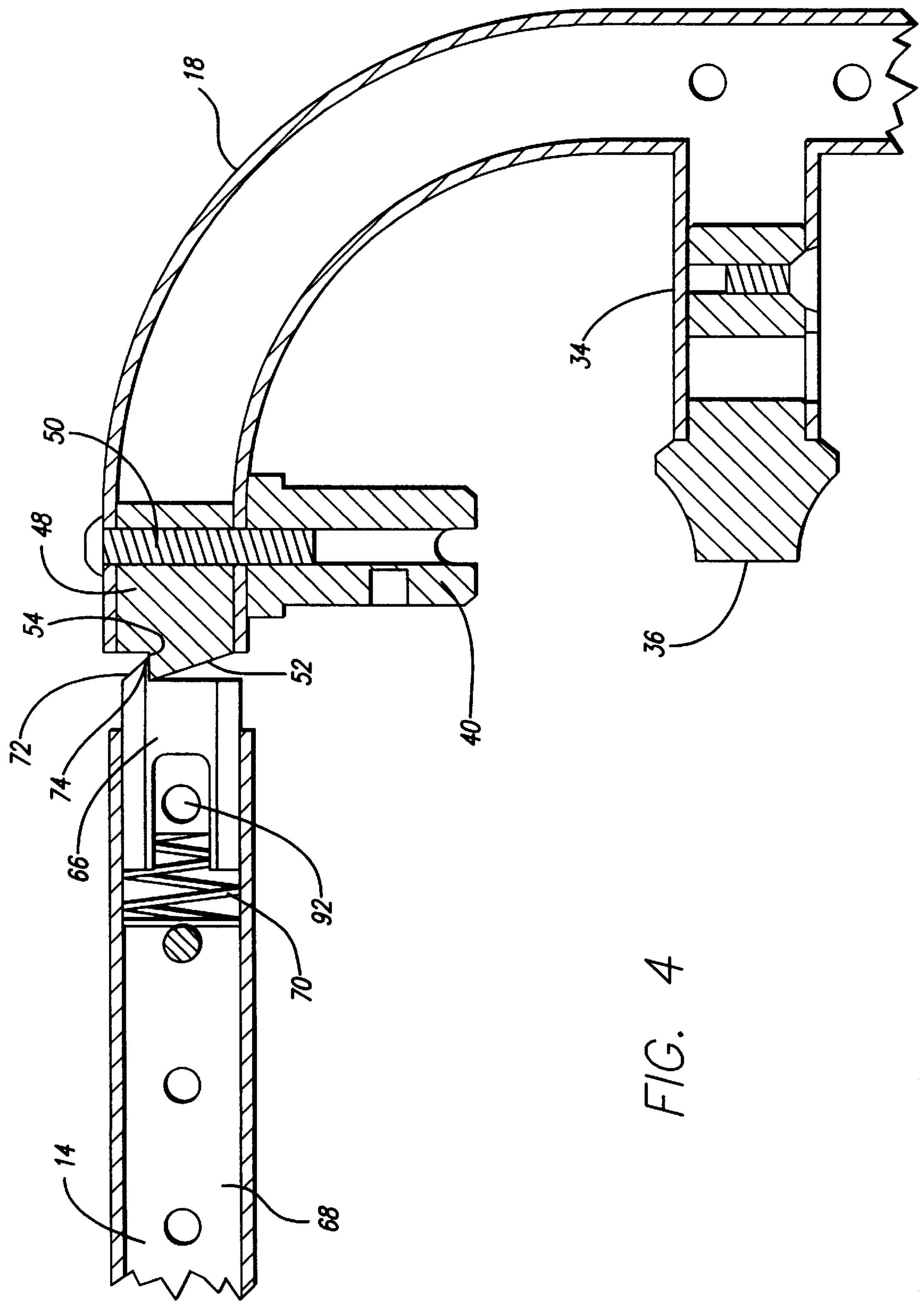
FIG. 4 is a partial sectional view of a footrest hanger in a locked configuration with a portion of the sideframe.

As FIG. 3 illustrates, the hanger pivot fitting 40 has a lower surface 44 with a semi cylindrical notch 46 at the bottom. A hanger locking insert 48 extends outwardly from the upper terminal end of portion 42 of the footrest hanger 18. As FIG. 2 illustrates, the hanger locking insert 48 has an angled, stepped surface extending from the terminal end 42 of the footrest hanger 18. Referring to FIG. 4, the swing away footrest hanger 18 is predominantly a hallow tube into which an upturned inner locking insert 48 is inserted and held in place with a bolt 50, which also holds the hanger pivot fitting 40 into place against the swing away footrest hanger 18. The upturned hanger locking insert 48 has an end having an upwardly angled lower surface 52 and a step 54, which may be also called an engagement step.

Considering FIG. 2 further, the left side frame 14 has a substantially rectangular shape, although the corners thereof are rounded. Like the swing away footrest hanger 18, the side frame 14 is typically tubular. A hanger plate 60 extends across the upper righthand corner of the side frame 14. A hanger release arm 62 is attached to the hanger plate 60, and may swing back and forth within an elongated opening 64 in the hanger plate 60. A hanger release insert 66 extends from an open end of the uppermost member of the side frame 14, and extends outwardly toward the swing away footrest hanger 18. Referring to FIG. 4, the hanger release insert 66 is housed within the top membrane of the side frame 14. The insert 66 is maintained in contact with the compression spring 70, such that the spring 70 maintains a compressive force pushing the hanger release insert 66 outwardly from the interior of the top side frame member 68. The hanger release insert 66 includes a downwardly angled face 72 and an engagement step 74 that is adapted for engagement with step 54 of the upturn hanger locking insert 48.

Referring again to FIG. 2, the swing away footrest hanger 18 is intended to engage and disengage with the side frame 14, as necessary. To hold the swing away footrest 18 into position on the side frame 14, a locking mechanism is provided. In the preferred embodiment, the locking mechanism is releasable so that after the swing away footrest hanger is locked into place, it can be remove when desired.

Figure 5:
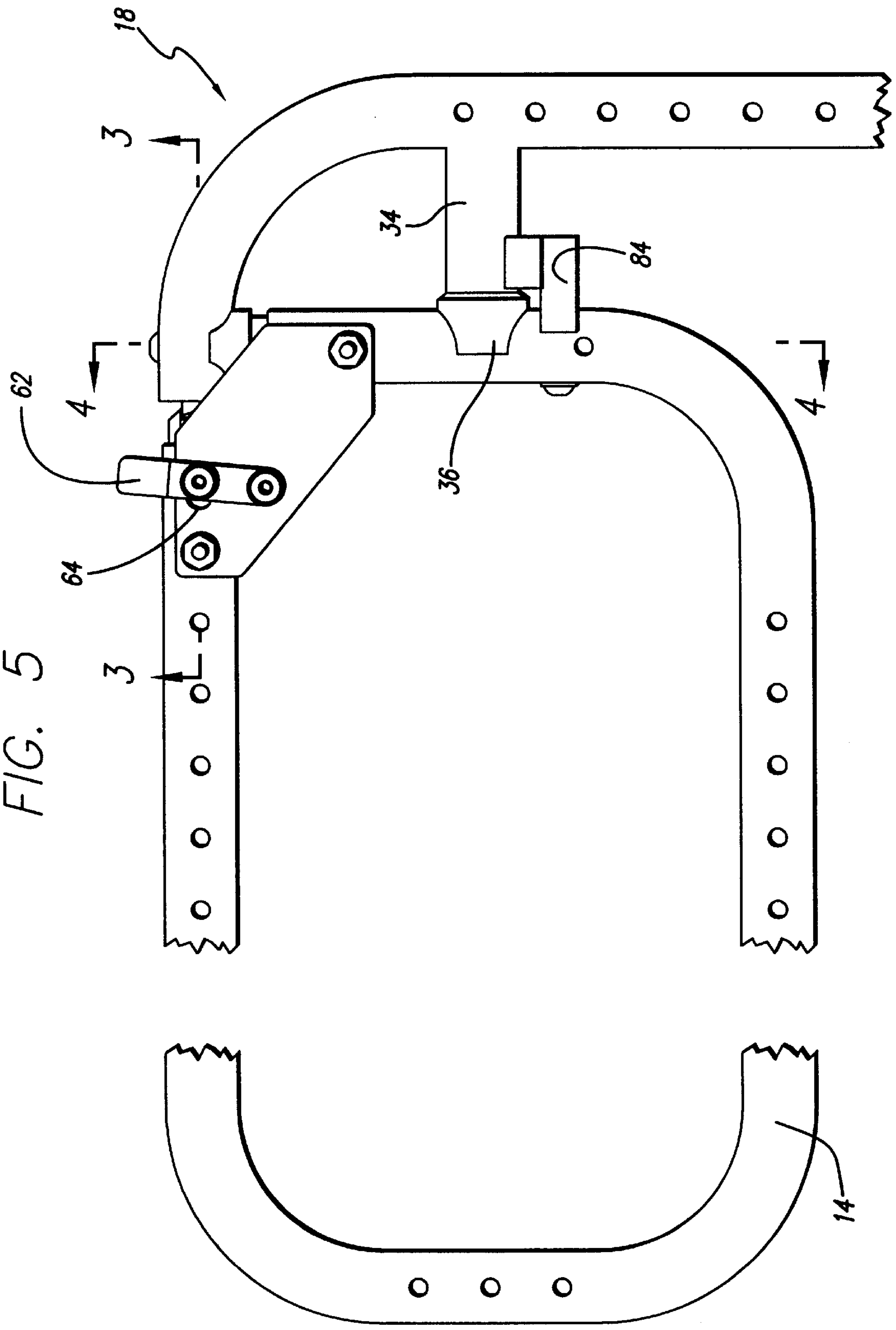
FIG. 5 is a side view of a footrest hanger in a locked configuration with a sideframe.

FIG. 5 is a side view of the arrangements of FIG. 2 with the footrest hanger 18 locked into position on side frame 14. The downward facing surface step 74 of hanger release insert 66 is engaged with the upward facing surface of step 54 on the upturned hanger locking insert 48, thereby locking the hanger 18 into place on the side frame 14. The hanger pivot fitting 40 has been inserted into an open tubular portion of the side frame 14 in the generally upward facing forward portion 72 of the side frame 14.

Figure 6:
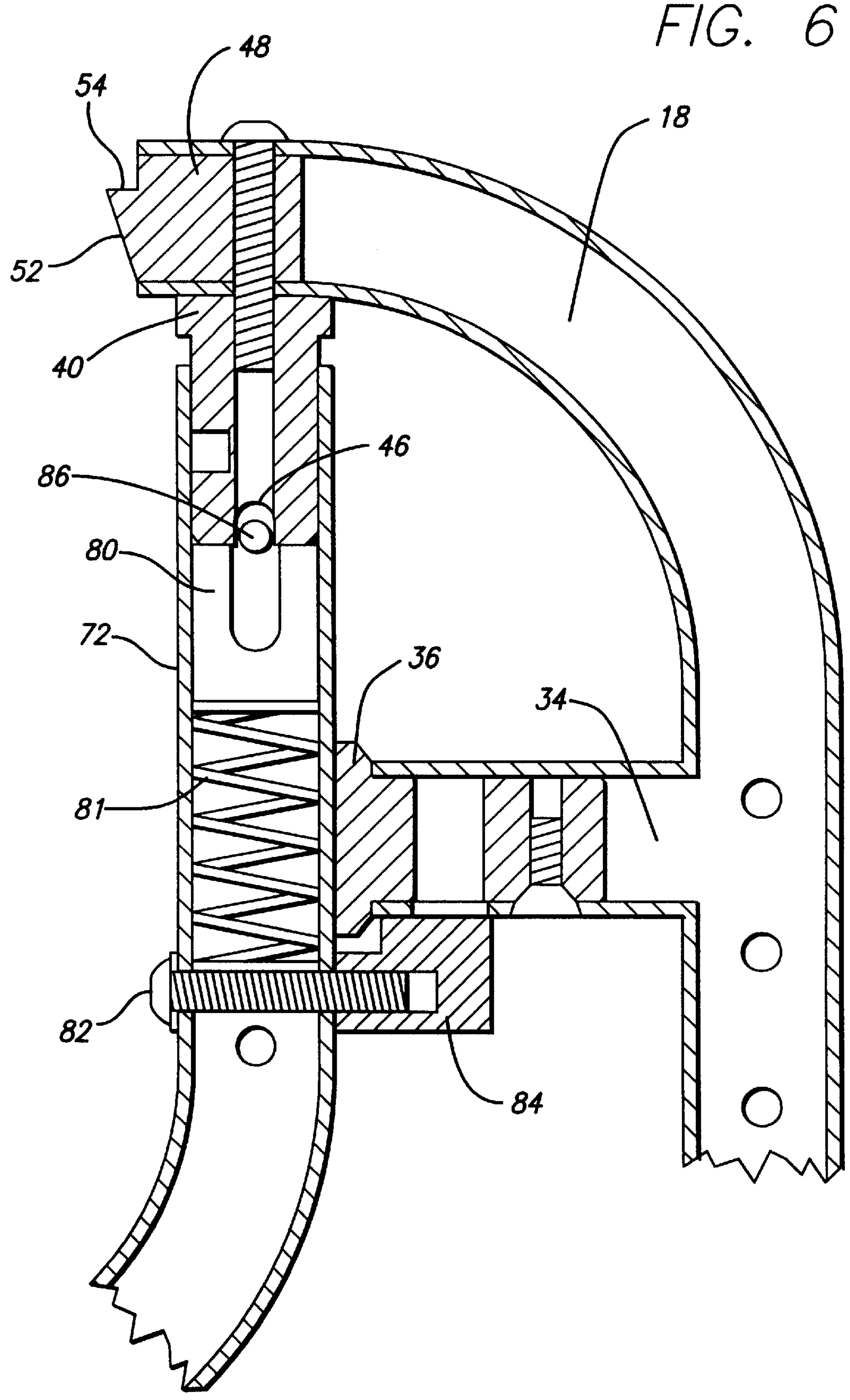
FIG. 6 is another partial sectional view of a footrest hanger in a locked configuration with a portion of the sideframe.

FIG. 6 illustrates the hanger 18 being inserted into the side frame 14. In particular, the hanger pivot fitting 40 is inserted into the interior of the forward portion of the side frame 72. As the hanger pivot fitting 40 is inserted into the forward portion of the side frame 72, the pivot fitting 40 comes into contact with the hanger spring guide 80. The hanger spring guide 80 is itself interconnected with a compressing spring 81, which is held into place with a bolt 82 that extends through the forward portion 72 of the side frame and into a hanger support block 84 that supports the hanger brace 34. The compression spring 81 is compressed when the hanger 18 is inserted into the forward portion of the side frame 72, thereby putting an upward force on the hanger spring guide 82 and in turn on the hanger pivot fitting 40. In the fully inserted position, FIG. 6 illustrates that the semi cylindrical notch 46 is adjacent to a bolt 86 that extends across the interior of the forward portion of the side frame 72. The bolt 86 serves, among other things, to attach a portion of the hanger plate 60 (FIG. 2) to the side frame 14.

In operation, to lock the hanger 18 to the side frame 14, the user inserts the hanger pivot fitting 40 into the upper forward portion 72 of the side frame and pushes downwardly to compress the compression spring 81. As the user continues to push downwardly on the hanger 18, the upwardly angled surface of the upturned hanger locking insert 48 moves against the downwardly angled face 72 of the hanger release insert 66. As the user continues to push down on the hanger 18, the downturn hanger release insert 66 is forced backwardly into the side frame, and compresses compression spring 70 to put a forward force against insert 66. The step 74 of the hanger release insert eventually engages with the step 54 of the upturned hanger locking insert 48, thereby locking the hanger 18 into place on the side frame 14. The compression spring 70 continuously puts a forward force on the downturned hanger release insert 66 against the upturned locking insert 48. In the locked position, the hanger alignment guide 36 is held adjacent to the side frame 14 along the forward portion of the side frame 72, to stabilize the horizontal location of the hanger 18. Because the hanger alignment guide has a concave engagement surface 38, the swing away hanger 18 is free to rotate to the left and right until the hanger 18 is fully locked into place on the side frame. Thus, for example, in FIG. 4 the hanger 18 is fully locked into place on the side frame 14, and the hanger 18 is not free to rotate to the left and right. However, once the hanger 18 is disengaged and unlocked from the side frame 14, the user may swing the hanger 18 back and forth as desired.

The preferred embodiment of the present invention also includes means for releasing the hanger 18 from the locked position. In particular, a hanger release arm 62 is rotatably mounted onto hanger plate 60 and is put into engagement with the hanger release insert 66 such that as the hanger release arm 62 is moved to the right, for example, the hanger release insert 66 also move to the right. Likewise, as the hanger release arm 62 is moved to the left, the hanger release insert 66 also moves to the left. The hanger release arm 62 is connected to the hanger release insert 66 by means of a bolt 90 that extends through the hanger release arm 52 through the elongated opening 64 and into and through an opening 92 (FIG. 4). The bolt 90 is then secured to the release insert 66 by means of a nut (not shown). Another bolt 96 acts a pivot point about which release arm 66 rotates.

The foregoing detailed description has described a presently preferred embodiment of the invention. The detailed description, in combination with the drawings, illustrates particular means for locking the footrest hanger onto the side frame, means for releasing the locking system, means for bracing the hanger against side frame, means for connecting the hanger brace to the side frame, and various other aspects of the preferred embodiment of the present invention. However, various alternative means are also possible within the scope of the invention. For example, with respect to the means for locking the footrest hanger onto the side frame, various alternative means may be employed. The surfaces on steps 54 and 74, respectively need not be perfectly flat. The surfaces may be provided with a wave or other irregular surface to provide more secure interlocking of the inserts 48 and 66. The surfaces may be roughened, angled, slotted, or otherwise varied in order to improve the interaction between the inserts 48 and 66. Similarly, rather than having the faces in an up-down orientation, the inserts may be rotated to a sideways orientation. The locking means may be further varied by making the release insert 66 fixed into position, and moving compression spring 70 to the interior of the footrest 18, such that the insert 48 moves back and forth against the compression spring while the release insert 66 remains fixed in position.

The locking means may be located elsewhere on the sideframe and/or the hanger. For example, the locking mechanism may be located within or on the side of hanger brace 34, or otherwise on the side of the hanger. The receiving portion of the locked will be located on the side frame such that it aligns with the locking surface on the hanger. Both the locking insert 48 and the release insert 66 may be housed in tubular or other members that are located on the side of the respective side frame and hanger, or on the side of one of them. Two or more locking mechanisms may be provided on each footrest and sideframe for a particularly strong lock. Furthermore, it is to be understood that there are various different types of sideframes and footrests, and that the locking means applies to a variety of specific wheelchair configurations. That is, the locking means relates to the interlocking-surface type of lock described herein, but not to the specific shape of the sideframe and hanger shown in the drawings.

Variations are also possible with respect to the means for releasing the locking system. As described above and illustrated in the drawings, the presently preferred release system relates to a hanger release arm 62 that is rotatably mounted on the hanger plate 60. However, other arrangements are possible. Various other types of release arms that are attached to the insert 66 may be used. For instance, a pin may simply extend outwardly from the insert 66 such that the user pulls the pin backwardly in order to move the insert 66 backwardly to unlock the hanger 18 from position. Alternatively, the release arm may move outwardly from the hanger plate rather than rotating parallel to the plate. The hanger plate itself is not necessary in some embodiments. Various other arrangements are easily imagined, and the release means includes the various type of release arms known in the art.

The presently preferred means for bracing the hanger against the side frame is a single hanger brace 34, which is a substantially tubular member extending in between downwardly extending substantially straight portion of the hanger 18 and towards the side frame 14. However, two or more than hanger braces may be used instead of just one. The hanger braces may have cross sections other than a simple tube, and may be solid, or have other types of cross sections such as square, triangular, elliptical, or any other cross section as appropriate. In some embodiments, the hanger brace 34 may be eliminated entirely and the means for bracing the hanger may be accomplished exclusively with the locking mechanism and the interaction between the pivot fitting 40 and the side frame 72.

The means for connecting the hanger brace to the side frame is preferably accomplished with a pivot fitting 40 and the substantially tubular receiving portion of side frame 14. However, it should be understood that the means may be accomplished with other arrangements. For example, the compression spring 81 is not necessary in all embodiments, and the semi cylindrical notch 46 is also not necessary. The hanger spring guide 80 is not needed if the compression spring 81 is not present in a particular embodiment. Furthermore, biasing means other than a compression spring may be used rather than a compression spring, a resilient material may be loaded within the side frame, or gel or pneumatic arrangements may be employed. Furthermore, the pivot fitting 40 may be replaced by any other number of other fixing arrangements such as one or more prongs that extend into corresponding receptacles, notch and slot arrangements, magnetic couplers, and even simple fastening arrangements such as hook and loop material. The hanger 18 may also be connected to the side frame 14 by means of a bolt, or by a simple removable pin and slot arrangement.

The particular dimensions of the various components will vary depending on the final size of a particular embodiment of a wheelchair. The specific materials that are to be used may be any that are commonly used in the art. In one common embodiment, standard steel tubing is employed. Other materials may be used as are known in the art of wheelchair making.

By way of illustration and not limitation, the dimensions of one particular embodiment of the invention are as follows. Referring to FIG. 6, the hanger locking insert 48 has a circular base with a diameter of approximately 13/16. It is 1¼" long at its longest section, and the upturned face 54 begins approximately 1 1/16" from the base and approximately 3/16" down from the top of the insert. The section of member 40 illustrated in FIG. 6 has a length of 1⅝" and a circular shaft having a diameter of approximately 13/16". Member 80 has a length of approximately 1" and a diameter of approximately 13/16". Compression spring 81 is approximately 3" long and has a diameter of ¾". Member 18 is a steel tube approximately 10" long from top to bottom, with a diameter of 1" and a tubular wall thickness of approximately 1/16". Member 34 is approximately 2¼" long. Member 36 is approximately 1¾" long at the cross-section in FIG. 6. Referring to FIG. 4, the compression spring 70 is approximately 1½" long and has a diameter of approximately ⅝". Member 66 is 1½" long at its longest, and has an elongated base that is approximately 13/16" at its widest and ⅝" at its narrowest. Downturned face 74 extends forward approximately $\frac{3}{8}$". Member 14 is a steel tube with a diameter of approximately 1" and a wall thickness of approximately $\frac{1}{16}$". The release handle 62 (FIG. 5) is approximately $2\frac{1}{4}$" long. Again, these dimensions apply to one particular embodiment of the invention, but other embodiments having different inventions that are appropriate for a wheelchair fall within the scope of the present invention.

It should be noted that the drawings are not production drawings and that the various dimensions and relative sizes are drawn for purposes of illustrating the general concept rather than for communicating exact dimensions and the relative sizes.

In light of the various changes and modifications that may be made, the invention is not limited to what is described to the detailed description or illustrated in the drawings, but should be measured solely by the scope of the following claim.

What is claimed is:

1. A locking system for a wheelchair side frame and a corresponding hanger, the system comprising:

a side frame having an open end and a retractable spring-loaded hanger release insert extending therefrom;

a hanger body having an upper portion with a terminal end;

a hanger pivot fitting extending generally downwardly from the upper portion;

a hanger locking surface extending from said terminal end;

said spring-loaded hanger release insert having an upturned mating surface and said hanger locking surface having a downturned mating surface compatible with said upturned mating surface;

a hanger release arm interconnected with said spring-loaded hanger release insert, said hanger release insert being retractable into said side frame upon operation of said hanger release arm, said hanger release arm being spring-biased such that said downturned mating surface normally extends from said side frame except when retracted into said side frame by operation of said hanger release arm.

2. A locking system as described in claim 1, wherein the system further comprises a hanger brace extending from the hanger body, having an alignment guide at an end of the hanger brace.

3. A locking system as defined in claim 1, wherein the hanger locking surface comprises an angled, generally outwardly-extending face with a step, and the hanger release insert comprises an angled, generally outwardly-extending face with a step, each of said steps defining a mutually-compatible mating surface.

4. A locking system as defined in claim 2, wherein the side frame further comprises a hanger support block extending from the side frame and adapted to support said hanger brace when said hanger brace is locked onto said side frame.

5. A locking system as defined in claim 1, wherein:

the side frame comprises a top, a bottom, a first side and a second side;

the said frame further comprises a hanger plate extending between the top and first side; and the hanger release arm is connected to the hanger plate.

6. A locking system as defined in claim 1, wherein the side frame comprises a tube, and a portion of the hanger release insert is secured within the tube.

7. A locking system as defined in claim 6, wherein a compression spring is secured within said tube to provide compression force against the hanger release insert.

8. A locking system as defined in claim 1, wherein said locking surface is a portion of a side frame locking piece, the hanger comprises a tube, a portion of said locking piece being secured within said tube, said locking surface extending out of said tube.

9. A locking system for a wheelchair side frame and a corresponding hanger, the system comprising:

a side frame;

a footrest hanger; and means for locking the footrest hanger onto said side frame.

10. A locking system for a wheelchair side frame and a corresponding hanger as defined in claim 9, the system further comprising means for releasing the means for locking the footrest hanger when said footrest hanger is locked onto said side frame.

11. A locking system for a wheelchair side frame and hanger as defined in claim 9, the system further comprising means for bracing the hanger against the side frame.

12. A locking system for a wheelchair side frame and hanger as defined in claim 9, the system further comprising means for connecting the hanger brace to the side frame.

13. A locking system for a wheelchair side frame and a corresponding hanger, the system comprising:

a side frame having a tubular member with an open end and a spring-loaded retractable hanger release insert extending outwardly from the open end of said tubular member;

a hanger body;

a hanger locking surface extending from said hanger body;

said spring-loaded hanger release insert having a substantially flat, upwardly facing mating surface extending from the open end of said tubular member and said hanger locking member having a substantially flat, downwardly facing mating surface that is compatible with said hanger release insert mating surface;

a compression spring mounted in said tubular member to bias said hanger release insert outwardly from the open end of said tube; and a hanger release arm interconnected with said spring-loaded hanger release insert;

wherein movement of said hanger release arm causes said hanger release insert to move within said tube, said locking system having a locked mode in which said hangar release insert extends our of said tube and said mating surfaces are engaged, and an unlocked mode in which the hanger release insert is moved inwardly toward said tube and said mating surfaces are disengaged.

* * * * *